US009495434B1

(12) United States Patent
Walton et al.

(10) Patent No.: US 9,495,434 B1
(45) Date of Patent: Nov. 15, 2016

(54) GEOGRAPHIC DISTRIBUTION OF FILES

(71) Applicant: EMC CORPORATION, Hopkinton, MA (US)

(72) Inventors: Jonathan Mark Walton, Seattle, WA (US); Jeffrey Douglas Hughes, Seattle, WA (US); Nathan Edward Dire, Seattle, WA (US); Alain Hamel, North Bend, WA (US); Justin Michael Husted, Seattle, WA (US); Eric Michael Lemar, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 263 days.

(21) Appl. No.: 13/794,198

(22) Filed: Mar. 11, 2013

Related U.S. Application Data

(60) Provisional application No. 61/666,638, filed on Jun. 29, 2012.

(51) Int. Cl.
*G06F 17/30* (2006.01)
(52) U.S. Cl.
CPC ... *G06F 17/30578* (2013.01); *G06F 17/30575* (2013.01); *G06F 17/30362* (2013.01)
(58) Field of Classification Search
CPC .................. G06F 17/30115; G06F 17/30362; G06F 17/30575; G06F 17/30563
USPC ................. 707/613, 609, 618, 610
See application file for complete search history.

(56) References Cited

U.S. PATENT DOCUMENTS

| 5,946,690 | A | * | 8/1999 | Pitts |
| 5,966,706 | A | * | 10/1999 | Biliris et al. |
| 6,523,066 | B1 | * | 2/2003 | Montroy et al. ............... 709/229 |
| 7,299,332 | B1 | * | 11/2007 | Misra ..................... G06F 9/5016 711/162 |
| 7,873,619 | B1 | * | 1/2011 | Faibish ............. G06F 17/30091 707/705 |
| 8,572,031 | B2 | * | 10/2013 | Merriman et al. ............ 707/613 |
| 2002/0166117 | A1 | * | 11/2002 | Abrams et al. ................ 717/177 |

* cited by examiner

*Primary Examiner* — Monica Pyo
(74) *Attorney, Agent, or Firm* — Krishnendu Gupta

(57) ABSTRACT

Embodiments are directed towards managing designations of a plurality of files across multiple clusters. Files may be designated as primary files or secondary files. Primary files at one cluster may be asynchronously replicated at another cluster as secondary files. Secondary files may be synchronously validated with remote primary files based on local file access requests. If a write request for a local secondary file is provided, then the local file may be designated as the primary file and the remote file may be designated as the secondary file. Local access may then be provided to the local primary file. If a read request for a local secondary file is provide, then local access may be provided to the local secondary file without changing file designations. In some embodiments, file designations may be preemptively changed based on a file change designation schedule for clusters at different geographic locations.

18 Claims, 10 Drawing Sheets

| 802 | 804 | 806 | 808 | 810 | 812 |
|---|---|---|---|---|---|
| GMT/ London, England | Local Time Tokyo, Japan | Local Time Seattle, Washington | Local Files in London, England | Local Files in Tokyo, Japan | Local Files in Seattle, Washington |
| 12:00 am | 9:00 am | 5:00 pm | Secondary | Primary | Secondary |
| 1:00 am | 10:00 am | 6:00 pm | | | |
| 2:00 am | 11:00 am | 7:00 pm | | | |
| 3:00 am | 12:00 pm | 8:00 pm | | | |
| 4:00 am | 1:00 pm | 9:00 pm | | | |
| 5:00 am | 2:00 pm | 10:00 pm | | | |
| 6:00 am | 3:00 pm | 11:00 pm | | | |
| 7:00 am | 4:00 pm | 12:00 am | ▼ | ▼ | |
| 8:00 am | 5:00 pm | 1:00 am | Primary | Secondary | |
| 9:00 am | 6:00 pm | 2:00 am | | | |
| 10:00 am | 7:00 pm | 3:00 am | | | |
| 11:00 am | 8:00 pm | 4:00 am | | | |
| 12:00 pm | 9:00 pm | 5:00 am | | | |
| 1:00 pm | 10:00 pm | 6:00 am | | | |
| 2:00 pm | 11:00 pm | 7:00 am | | | |
| 3:00 pm | 12:00 am | 8:00 am | ▼ | | ▼ |
| 4:00 pm | 1:00 am | 9:00 am | Secondary | | Primary |
| 5:00 pm | 2:00 am | 10:00 am | | | |
| 6:00 pm | 3:00 am | 11:00 am | | | |
| 7:00 pm | 4:00 am | 12:00 pm | | | |
| 8:00 pm | 5:00 am | 1:00 pm | | | |
| 9:00 pm | 6:00 am | 2:00 pm | | | |
| 10:00 pm | 7:00 am | 3:00 pm | ▼ | ▼ | ▼ |
| 11:00 pm | 8:00 am | 4:00 pm | | | |

GEOGRAPHIC DISTRIBUTION OF FILES

CROSS REFERENCE TO RELATED APPLICATIONS

This non-provisional patent application claims the benefit under 35 U.S.C. §119(e) of U.S. Provisional Patent Application Ser. No. 61/666,638 filed on Jun. 29, 2012, entitled "Geographic Distribution of Files," which is incorporated herein by reference.

TECHNICAL FIELD

The present invention relates generally to file management and, more particularly, but not exclusively to providing asynchronous replication and synchronous validation of files among a plurality of clusters of nodes.

BACKGROUND

Today, many distributed file systems enable users to access files from a number of remote locations. Files can often be stored in a centralized location and remotely accessed by other systems, such as client devices. In some situations, each time a remote system writes to a centralized file, the remote system and the centralized file system may exchange multiple messages to ensure data is written to the centralized location. As a result, each remote file access may increase data traffic and slow overall system performance. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 8 illustrates a non-exhaustive example of a use case of an embodiment of a table indicating a schedule for changing a file designation of files at different geographic locations based on a time of day at the different geographic locations.

DETAILED DESCRIPTION

Figure 1:
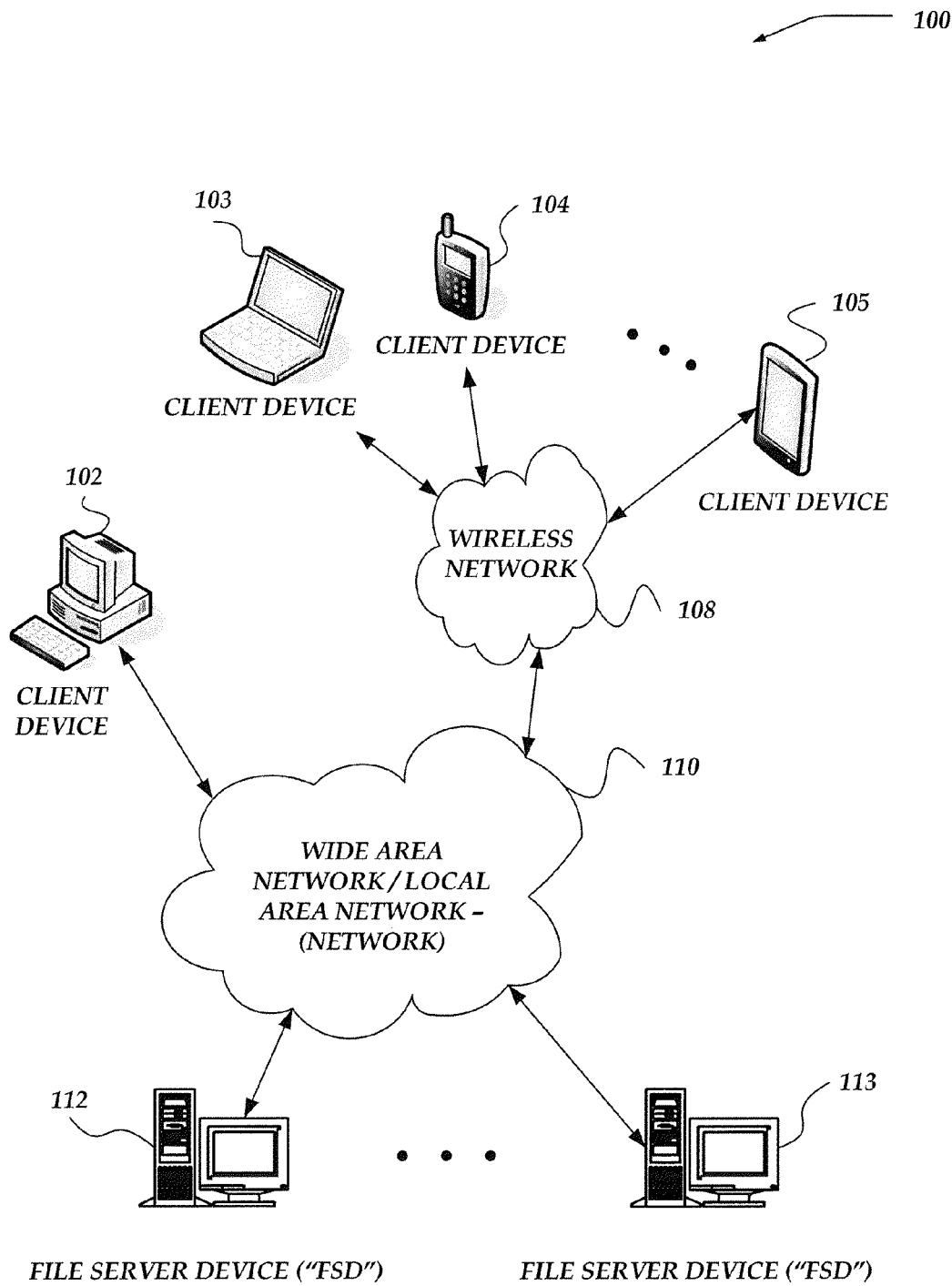
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

As used herein, the term "cluster" and/or "cluster of nodes" refers to one or more logically connected nodes. In some embodiments, each node within a cluster may communicate information about nodes within the cluster to other nodes in the cluster. In some other embodiments, a cluster may include a coordinator node to delegate actions between the nodes in the cluster, manage a status of the cluster, or the like.

As used herein, the term "inode" refers to data structures that may store information, or meta-data, about files and folders, such as file ownership, access mode (read, write, execute permissions), time and date of creation and modification, file type, version, file designation, or the like. In one embodiment, inode data structures may contain one or more references or pointers to the actual data blocks of the file (i.e. the parent file). In some embodiments, inodes may be in a known location in a file system. From an inode, a reader or writer may access the contents of the inode and the contents of the file. Some file systems implement inodes using a data structure called an inode. In some embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

As used herein, the term "local request" and/or "local file access request" refers to a write request and/or a read request for a file that is local to a cluster. In at least one embodiment, a client device may be a connected to and/or associated with a particular cluster, such that a local request from the client device may be for a file maintained by the associated cluster. In some embodiments, a cluster may provide local access to a client device in response to a local file access request. As used herein, the term "local access" refers to a cluster providing write access and/or read access to a file maintained by the cluster (i.e., a local file). In at least one embodiment, local access may enable a client device to read and/or write to a file.

As used herein, the term "primary file" refers to a master copy of a file. In some embodiments, a file may include a tag, attribute, reference, or the like designating the file as a primary file. In at least one embodiment, primary files may be asynchronously replicated as secondary files. As used herein, the term "secondary file" refers to a duplicate copy of a primary file. In some embodiments, primary files may be read and/or modified, whereas secondary files may be read, but not modified. In at least one embodiment, a secondary file may be a failover and/or backup copy of a primary file. Primary files and/or secondary files may be local or remote to a given cluster. For example, a secondary file maintained by a given cluster may be referred to as a local secondary file, but may be a remote secondary file to a different cluster. Similarly, a primary file maintained by a given cluster may be referred to as a local primary file, but may be a remote primary file to a different cluster.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing a designation of each of a plurality of files across a plurality of clusters. In some embodiments, files may be designated as primary files or secondary files. In at least one embodiment, a file may be a primary file at one cluster and may have a corresponding secondary file at another cluster. In some embodiments, the secondary file may be a current or old copy of at least a subset of the primary file. In some embodiments, each primary file at a given cluster may be asynchronously replicated at another cluster as a secondary file. In some embodiments, asynchronous replication may enable point in time failover guarantees.

In at least one embodiment, a local file access request may be provided to a given cluster. In some embodiments, if the access request is for a local primary file, then the given cluster may provide local access to the primary file. In other embodiments, if the access request is for a local secondary file, then the secondary file may be synchronously validated, at least in part, with a corresponding remote primary file at a different cluster. After the secondary file is synchronously validated with the primary file, the given cluster may provide local access to the secondary file.

In various embodiments, the local file access request may be a write request or a read request. In some embodiments, if a write request for a local secondary file is provided, then the local secondary file and a remote primary file may swap file designations. In one such embodiment, after the local secondary file is synchronously validated with the remote primary file, the local file may be designated as the primary file and the remote file may be designated as the secondary file. In other embodiments, if a read request for the local secondary file is provided, then a partial lock may be obtained on the remote primary file, but the file designations of the local file and the remote file may not change.

In some other embodiments, a file designation may be preemptively changed independent of an access request. In at least one embodiment, a file change designation schedule may be utilized to change designations of files at clusters physically located at different geographic locations. For example, files at a cluster in London, England may be designated as primary files during London business hours, while files at clusters in other locations (e.g., Seattle, Wash., USA) may be designated as secondary files. However, file designations may preemptively change during Seattle business hours such that files at a cluster in Seattle may be designated as primary files and files at clusters in other locations (e.g., London) may be designated as secondary files.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 110, wireless network 108, client devices 102-105, and File Server Devices ("FSD") 112-113.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol ("IP") address, a phone number, Mobile Identification Number ("MIN"), an electronic serial number ("ESN"), or other device identifier. Such information may be provided in a network packet, or the like, sent between other client devices, FSD 112-113, or other computing devices.

Client devices 102-105 may further be configured to include a client application that enables an end-user to log into an end-user account that may be managed by another computing device, such as FSD 112-113, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN ("WLAN") networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router ("WR") mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobile communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HS-DPA"), Long Term Evolution ("LTE"), and the like. In essence, wireless network 108 may include virtually any wireless communication mechanism by which information may travel between client devices 103-105 and another computing device, network, and the like.

Network 110 is configured to couple network devices with other computing devices, including, FSD 112-113, client device 102, and client devices 103-105 through wireless network 108. Network 110 is enabled to employ any form of computer readable media for communicating information from one electronic device to another. Also, network 110 can include the Internet in addition to local area networks ("LANs"), wide area networks ("WANs"), direct connections, such as through a universal serial bus ("USB") port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol ("IP"). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

FSD 112-113 include virtually any network device usable to manage designations of files across multiple clusters. In some embodiments, FSD 112 may include and/or operate as one cluster and FSD 113 may include and/or operate as another cluster. However, embodiments are not so limited.

In at least one embodiment, FSD 112-113 may identify a primary file among a plurality of files. In some embodiments, each of FSD 112-113 may separately manage files, such that files managed by FSD 112 may be local files to FSD 112 and remote files to FSD 113. Similarly, files managed by FSD 113 may be local files to FSD 113 and remote files to FSD 112. In some embodiments, FSD 112-113 may continuously, asynchronously replicate primary files at other clusters as secondary files. In some embodiments, FSD 112-113 may provide access to a local file based on a local file access request received from another device, such as client devices 102-105. In at least one embodiment, if the local file access request is for a local primary file, then FSD 112-113 may provide access to the local primary file. In another embodiment, if the local file access request is for a local secondary file, then the local secondary file may be synchronously validated with a remote primary file. In some embodiments, if the access request is a write request for a local secondary file, then, after synchronous validation of the local secondary file, the local file may be designated as the primary file and the remote file may be designated as the secondary file.

In various embodiments, FSD 112-113 may be physically located in different geographic locations. In some embodiments, FSD 112-113 may preemptively change file designations based on a file designation change schedule. In at least one embodiment, the file designation change schedule may change file designations based on a local time at each geographic location of FSD 112-113. In any event, FSD 112-113 may employ processes such as described below in conjunction with FIGS. 4-7 to perform at least some of its actions.

Devices that may be arranged to operate as FSD 112-113 include various network devices, including, but not limited to personal computers, desktop computers, multiprocessor systems, microprocessor-based or programmable consumer electronics, network PCs, server devices, network appliances, and the like.

Although FIG. 1 illustrates FSD 112 and FSD 113 as single computing devices, embodiments are not so limited. For example, one or more functions of FSD 112 and/or FSD 113 may be distributed across one or more distinct network devices, or the like. In some embodiments, FSD 112 and/or FSD 113 may include one or more nodes, one or more clusters, or the like. Similarly, although FIG. 1 illustrates two file server devices, embodiments are not so limited; rather, a plurality of file server devices may be employed.

Moreover, FSD 112 and/or FSD 113 are not limited to a particular configuration. Thus, in one embodiment, FSD 112 and/or FSD 113 may contain a plurality of network devices. Similarly, in another embodiment, FSD 112 and/or FSD 113 may contain a plurality of network devices that operate using a master/slave approach, where one of the plurality of network devices of FSD 112 and/or FSD 113 operates to manage and/or otherwise coordinate operations of the other network devices. In other embodiments, FSD 112 and/or FSD 113 may operate as a plurality of network devices within a cluster architecture, a peer-to-peer architecture, and/or a cloud architecture. Thus, the invention is not to be construed as being limited to a single environment, and other configurations, and architectures are also envisaged.

Illustrative Client Device

Figure 2:
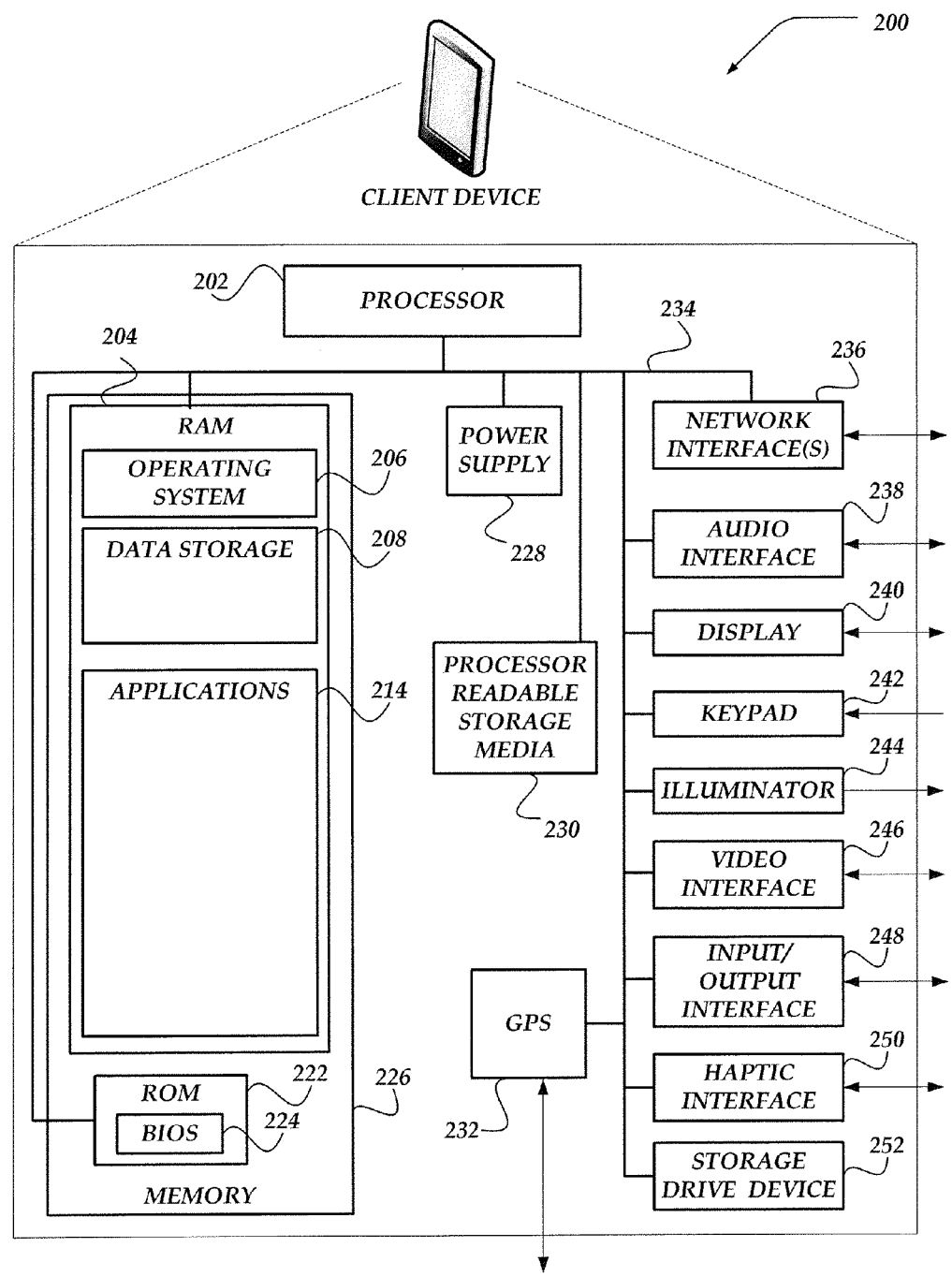
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with memory 226 via bus 234. In some embodiments, processor 202 may include one or more central processing units ("CPU"). Client device 200 also includes a power supply 228, one or more network interfaces 236, an audio interface 238, a display 240, a keypad 242, an illuminator 244, a video interface 246, an input/output interface 248, a haptic interface 250, and a storage drive device 252, and a global positioning system ("GPS") transceiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol ("UDP"), transmission control protocol/Internet protocol ("TCP/IP"), short message service ("SMS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, tri-angulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Memory 226 includes a Random Access Memory ("RAM") 204, a Read-only Memory ("ROM") 222, and other storage means. Memory 226 illustrates an example of computer readable storage media (devices) for storage of information such as computer readable instructions, data structures, program modules or other data. Memory 226 stores a basic input/output system ("BIOS") 224 for controlling low-level operation of client device 200. The memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include, or interface with a Java virtual machine module that enables control of hardware components and/or operating system operations via Java application programs.

Memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of client device 200, including, but not limited to processor readable storage media 230, storage drive device 252, or other computer readable storage medias (not shown) within client device 200. Storage drive device 252 may include hard disk drives, flash drives, solid state memory devices, optical drives, and the like.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage media 230 may also be referred to as computer readable storage device.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Applications 214 may include application programs that can access files. In various embodiments, file access can include, but is not limited to, reading and/or writing data, editing data, processing data, consuming data, reformatting data, analyzing data, generating data, manipulating data, or the like. In some embodiments, at least one of a variety of protocols may be employed to access a file, such as, but not limited to, Network File System ("NFS"), Server Message Block ("SMB"), File Transfer Protocol ("FTP"), Hypertext Transfer Protocol ("HTTP"), or the like. In at least one of various embodiments, accessing files may follow industry standards, such as Portable Operating System Interface ("POSIX") or the like.

Illustrative Network Device

Figure 3:
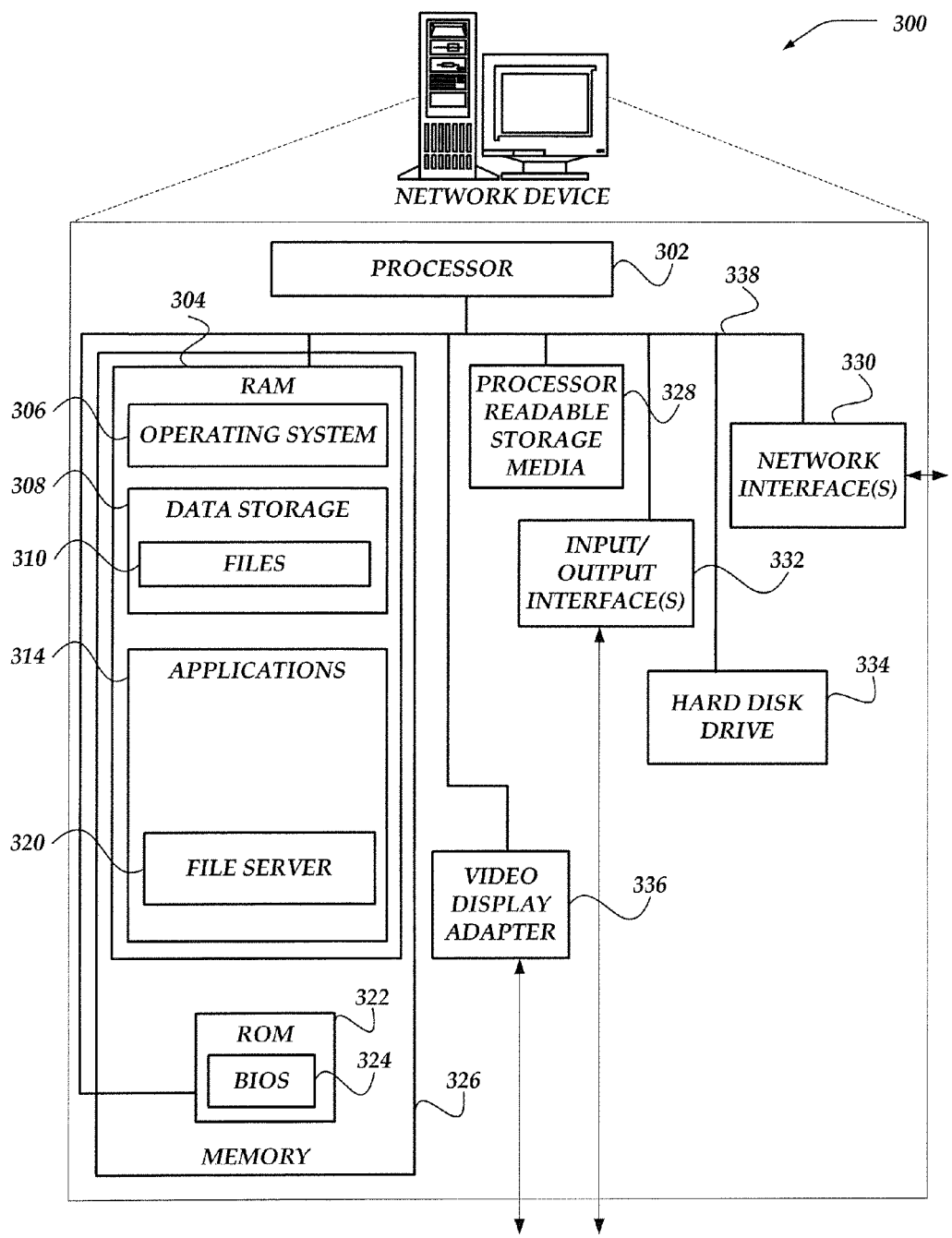
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example FSD 112-113 of FIG. 1. In some embodiments, network device 300 may be configured as one or more nodes in a cluster of nodes. In at least one of various embodiments, FSD 112 may be configured as one cluster of nodes and FSD 113 may be configured as another cluster of nodes. In some embodiments, FSD 112 and FSD 113 may be physically located in different geographical locations.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system ("BIOS") 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, DVD or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like.

Data storage 308 may further store files 310. Files 310 may include files, directories, objects, or the like. In at least one embodiment, each cluster, such as FSD 112 and/or FSD 113 may maintain files 310 independent of other clusters. In some embodiments, each file, directory, or the like in files 310 may include a tag or other indicator identifying the file/directory as primary or secondary. In other embodiments, files 310 may maintain a table, or other data structure, that identifies which files/directories are primary and/or which files/directories are secondary.

Applications 314 may include computer executable instructions, which may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Applications 314 may also include file server 320.

File server 320 may be configured to manage designations of files across multiple clusters. In at least one embodiment, file server 320 may asynchronously replicate primary files managed by file server 320, such as files 310, at other clusters as secondary files. In some embodiments, file server 320 may enable access to a local file (including files 310) based on a local file access request. In at least one embodiment, if the local file access request is for a local primary file, then file server 320 may enable access to the local primary file. In another embodiment, if the local file access request is for a local secondary file, then file server 320 may synchronously validated the local secondary file with a remote primary file. In some embodiments, if the access request is a write request for a local secondary file, then, after synchronous validation of the local secondary file, file server 320 may designate the local file as the primary file and the remote file as the secondary file.

In some embodiments, file server 320 may generate, manage, or otherwise maintain a file designation change schedule. In at least one embodiment, file server 320 may preemptively change file designations based on a local time at each of a plurality of clusters at different geographic locations. In some embodiments, file server 320 may coordinate file designation changes between clusters. In any event, file server 320 may employ processes, or part of processes, such as described below in conjunction with FIGS. 4-7 to perform at least some of its actions.

General Operation

Figure 4:
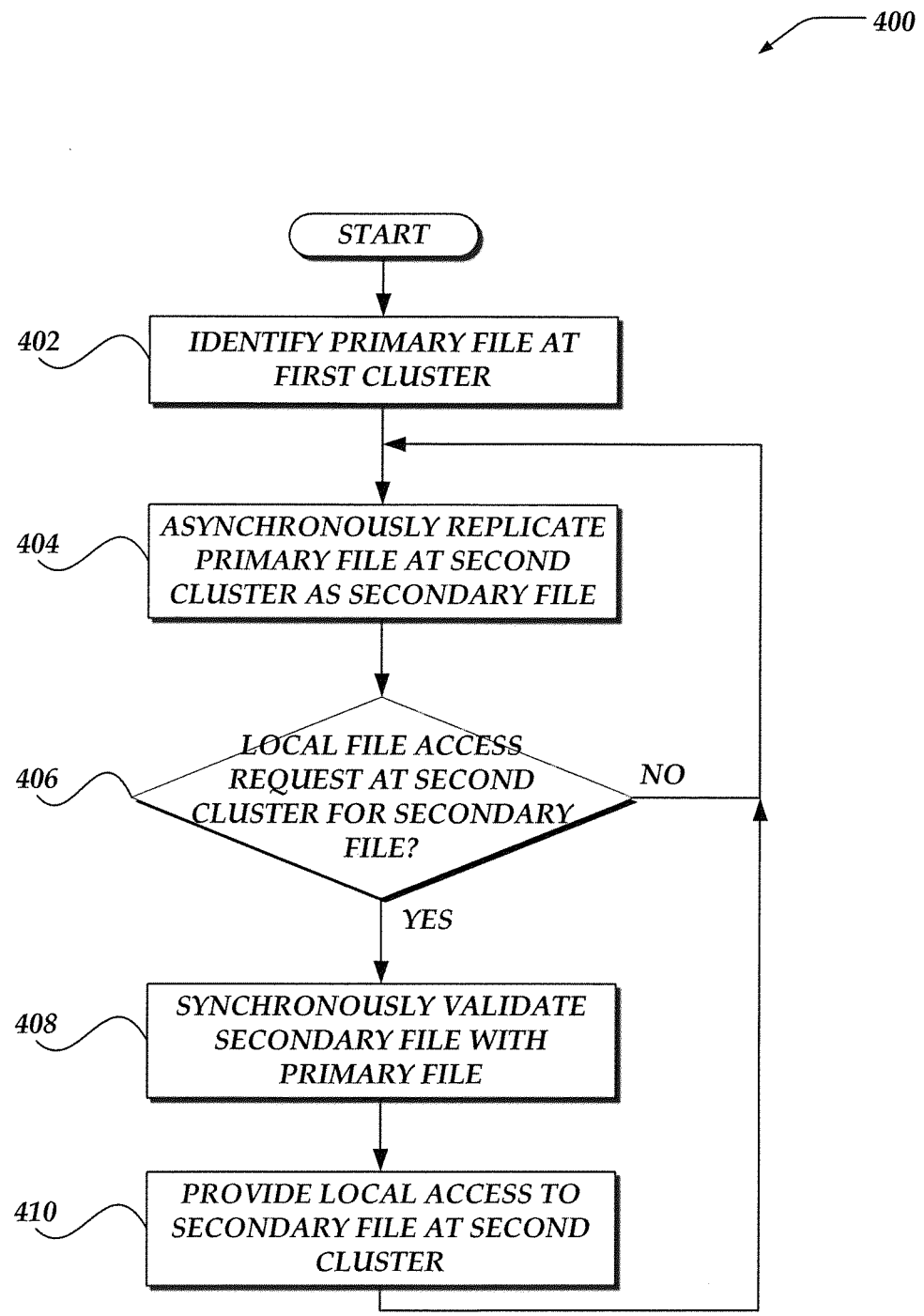
FIG. 4 illustrates a logical flow diagram generally showing one embodiment of an overview process for providing asynchronous replication of primary files and synchronous validation of secondary files.

The operation of certain aspects of the invention will now be described with respect to FIGS. 4-7. FIG. 4 illustrates a logical flow diagram generally showing one embodiment of an overview process for providing asynchronous replication of primary files and synchronous validation of secondary files. In some embodiments, process 400 of FIG. 4 may be implemented by and/or executed on one or more network devices, such as network device 300 of FIG. 3. For example, in some embodiments, a first cluster may include and/or be implemented on at least one computing device, such as FSD 112 of FIG. 1, and the second cluster may include and/or be implemented on at least one other computing device, such as FSD 113 of FIG. 1. Although FIG. 4 describes a first cluster and a second cluster, embodiments are not so limited; but rather, a plurality of clusters may be employed, such that a file may be designated as a primary file on one cluster and a secondary file on other clusters. Furthermore, a cluster may manage a plurality of files. In some embodiments, a cluster may manage a file by storing the file at the cluster. Various embodiments may describe a file (e.g., a primary file, a secondary file, a local file, a remote file, or the like) at a cluster (e.g., a local cluster, a remote cluster, or the like), which may refer to a file managed by a cluster.

Process 400 begins, after a start block, at block 402, where a primary file at a first cluster may be identified. In some embodiments, a file may be identified as a primary file based on file metadata, a tag associated with the file, or the like. In other embodiments, an inode of a file may include an identifier indicating a designation of the file, such as a primary file or a secondary file. In yet other embodiments, the first cluster may maintain a table or other data structure that identifies which files maintained by the first cluster may be primary files and which files may be secondary files. In various embodiments, a file may be designated as a primary file when the file is created. In some embodiments, the identified file may include files, directories, other data objects, or the like. In at least one embodiment, each primary file at a given cluster may be individually identified, such that process 400 may be performed for each primary file at the given cluster.

Process 400 continues to block 404, where the primary file may be asynchronously replicated at a second cluster as a secondary file. In some embodiments, each primary file on a first cluster may be asynchronously replicated at one or more other clusters that are different than the first cluster. In some embodiments, asynchronous replication may be performed independent of access requests for the primary file and/or secondary file. In some embodiments, asynchronous replication may be performed randomly, at predetermined times, at periodic time intervals, or the like.

In at least one embodiment, asynchronous replication may refer to copying the primary file from the first cluster to the second cluster as a secondary file. In another embodiment, asynchronous replication may include determining a delta between the primary file and the secondary file and updating the secondary file based on the determined delta. In some embodiments, a subset of the primary file may be asynchronously replicated at the second cluster. In at least one such embodiment, the secondary file may be a copy of a subset of the primary file.

Since the secondary file may mirror the primary file, in at least one embodiment, asynchronous replication may allow for point in time failover guarantees. In one such embodiment, secondary files may be utilized as failover copies if the primary file is lost, deleted, corrupted, unreadable, or the like.

In some other embodiments, a portion of the primary file may be asynchronously replicated. In at least one embodiment, the secondary file may be a cache of the primary file, which may include a subset of the primary file. In other embodiments, the secondary file may be a copy of the primary file, but a portion and/or subset of the primary file may be asynchronously replicating as a corresponding portion and/or subset of the secondary file. For example, a first x number of bits of the primary file may not be asynchronously replicated at the secondary file, while the remainder of the primary file may be asynchronously replicated.

Process 400 next proceeds to decision block 406, where a determination may be made whether a local file access request is provided at the second cluster for the secondary file. In some embodiments, a client device, such as client devices 102-105 of FIG. 1, may provide a local write request and/or a read request to the second cluster for the secondary file. If a local file access request is provided for the secondary file, then processing may flow to block 408; otherwise, processing may loop to block 404 to continue to asynchronously replicate the primary file at the second cluster. In at least one embodiment, if the local file access request is provided at the second cluster for a primary file local to the second cluster, then local access may be provided to the local primary file, which is described in more detail below in conjunction with FIGS. 5 and 6.

At block 408, the secondary file may be synchronously validated with the primary file. In at least one embodiment, a portion of the secondary file may be synchronously validated with a corresponding portion of the primary file. In some embodiments, the secondary file may be synchronously validated with the primary file by comparing the secondary file with the primary file. In at least one embodiment, such a comparison may be performed by comparing attributes of the files, such as, but not limited to, comparing file access times, file modification times, file versions, file sizes, file contents, or the like. For example, in at least one embodiment, synchronous validation may include comparing a version of the secondary file with a version of the primary file. If a version of the secondary file matches a version of the primary file, then the secondary file may be a valid copy of the primary file (i.e., the secondary file may be affirmatively validated); otherwise, the secondary file may be an invalid copy of the primary file. In at least one embodiment, an invalid copy of a primary file may refer to a stale copy of the primary file, an older version of the primary file, or the like. In some other embodiments, if a version of the portion of the secondary file matches a version of the corresponding portion of the primary file, then that portion of the secondary file may be a valid copy of the corresponding portion of the primary file (i.e., that portion of the secondary file may be affirmatively validated); otherwise, that portion of the secondary file may be an invalid copy (e.g., an older version) of the corresponding portion of the primary file.

If the secondary file is an invalid copy of the primary file (e.g., an older version of the primary file), then the secondary file may be updated based on the primary file. Various embodiments of updating the secondary file may include, but are not limited to, copying the primary file from the first cluster to the second cluster, determining a delta between the primary file and the secondary file and updating the secondary file based on the determined delta, or the like. In at least one embodiment, the secondary file may be affirmatively validated after the secondary file is updated based on the primary file. In some embodiments, the second cluster may obtain a lock from the first cluster to synchronously validate the secondary file. In at least one embodiment, the lock may be a shared lock between the first cluster and the second cluster, such that the first cluster may be enabled to access and/or modify the primary file while the second cluster synchronously validates the secondary file. In one such embodiment, the first cluster may notify the second cluster if the first cluster accesses and/or modifies the primary file.

In some embodiments, a portion of the secondary file may be synchronously validated, while another portion of the secondary file may not be synchronously validated. In at least one embodiment, the portion of the secondary file to synchronously validate may be the portion of the file associated with a local file access request. In other embodiments, a portion of the secondary file may be synchronously validated and local access may be provided (at block 410) to that portion of the secondary file prior to synchronously validated a remainder of the secondary file. In yet other embodiments, a portion of the secondary file may be synchronously validated and local access may be provided (at block 410) to that portion of the secondary file and the remainder of the secondary file may not be validated. Accordingly, a portion of the secondary file may be up-to-date and another portion may be out-of-date. In at least one such embodiment, the out-of-date portion may be updated during a next asynchronous replication at block 404. In some embodiments, out-of-date data may include valid data that has an old timestamp, invalid data, or the like.

In some other embodiments, the secondary file may be a cached version of the primary file. In at least one such embodiment, the secondary file may be a temporary file and/or a partial copy of the primary file. The secondary cached file may be synchronized by purging the secondary file and/or purging out-of-date sections of the secondary file. In some embodiments, the secondary cached file may be updated based on the primary file. In at least one embodiment, the secondary cached file may include a portion and/or less than the entire contents of the primary file. In some embodiments, the portion of the primary file to store as the secondary file may be based on a request for access of the file, a portion of the primary file that is continuously changing (e.g., x number of changes per hour), an available storage size for the secondary file, predetermined portion of the primary file, or the like, or any combination thereof.

In any event, process 400 next proceeds to block 410, where local access to the secondary file may be provided at the second cluster. In some embodiments, if the secondary file is affirmatively validated at block 408, then a client device (e.g., client device 200 of FIG. 2) may be enabled to locally access the secondary file. In at least one embodiment, if the local file access request is a write request, then file designations (i.e., primary/secondary) may change, which is described in more detail below in conjunction with FIG. 5. In another embodiment, if the local file access request is a read request, then file designations may not change, which is described in more detail below in conjunction with FIG. 6. After block 410, process 400 loops to block 404 to continue to asynchronously replicate the primary file.

Figure 5:
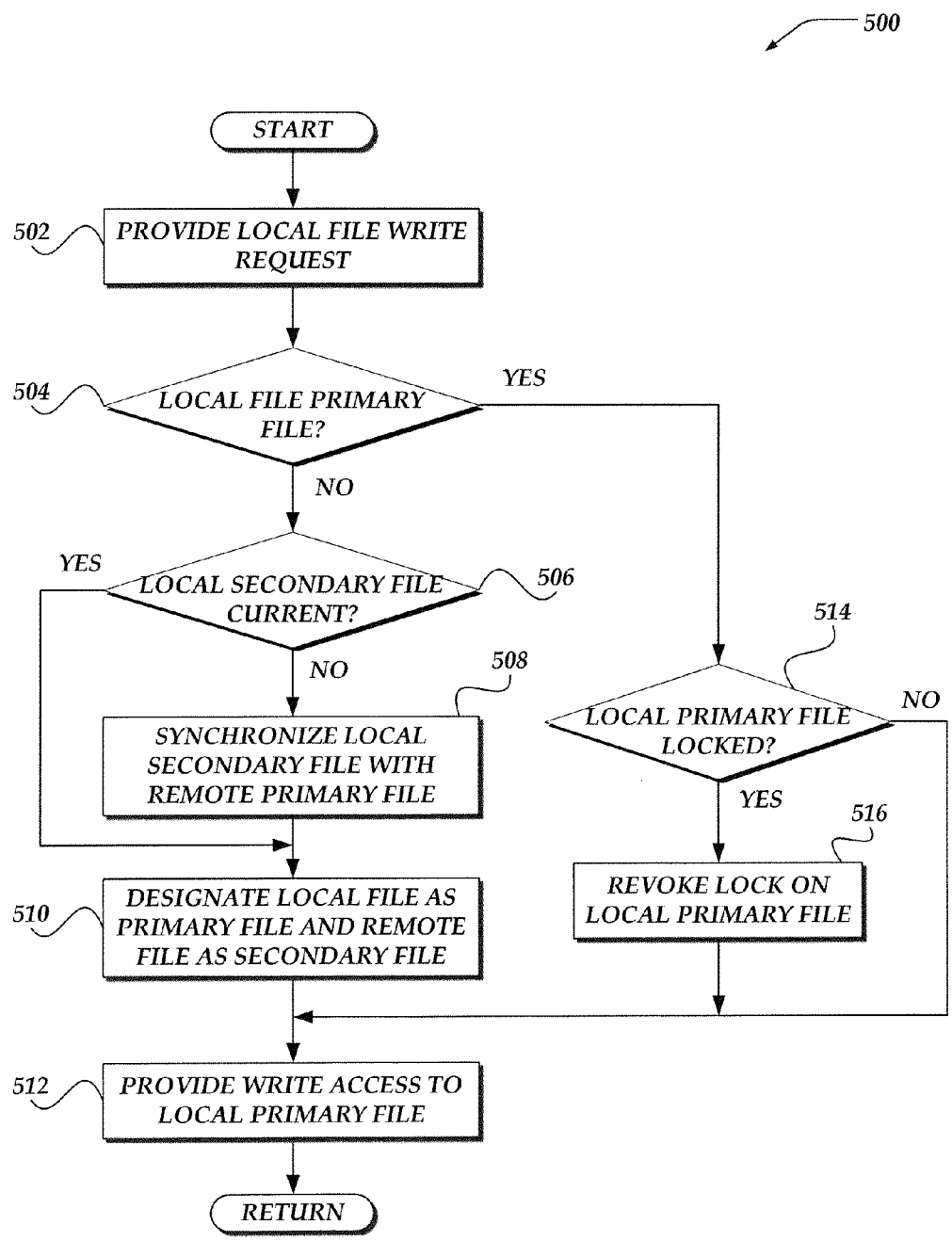
FIG. 5 illustrates a logical flow diagram generally showing one embodiment of a process for designating a local secondary file as a local primary file for a local file write request.
Figure 6:
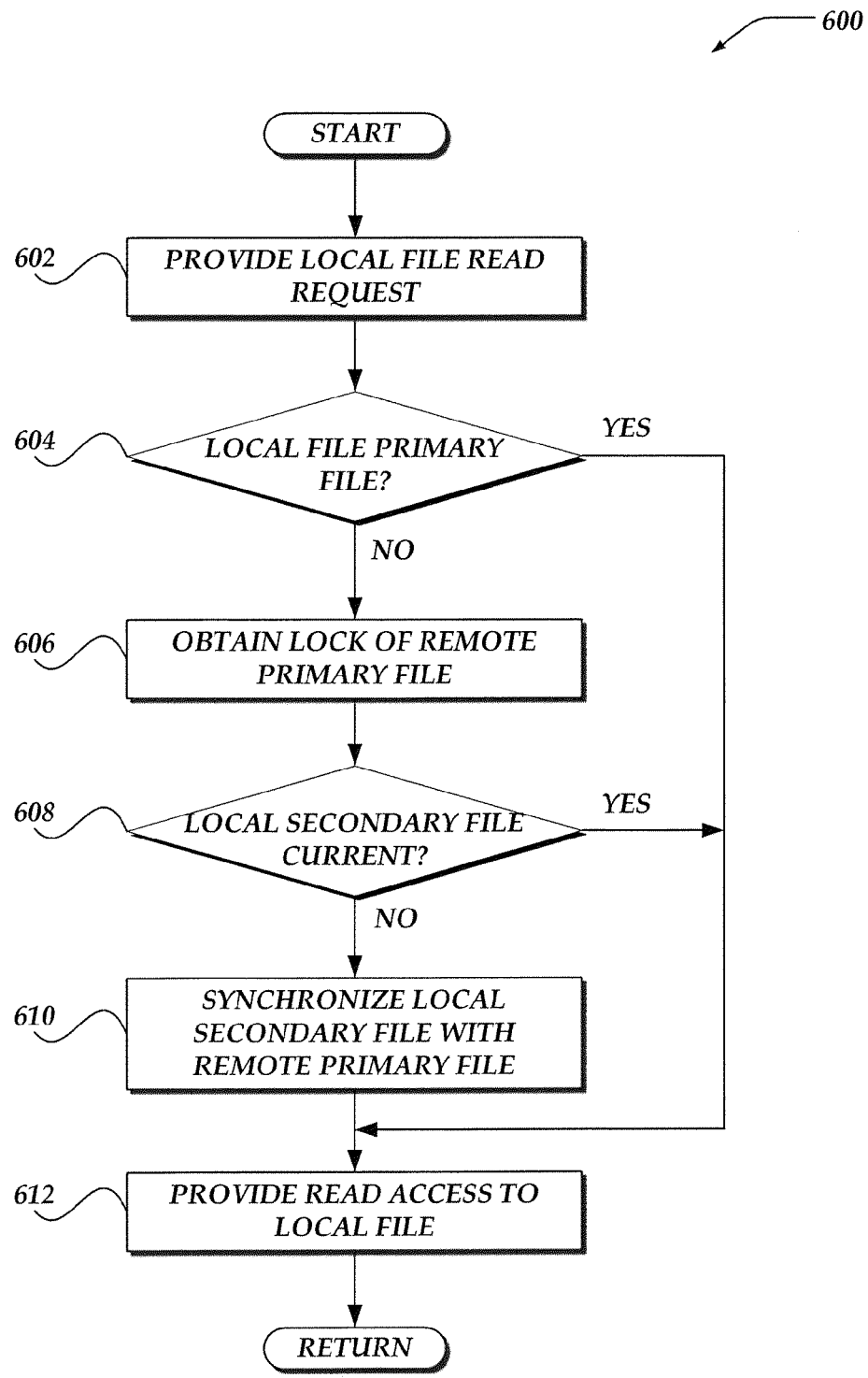
FIG. 6 illustrates a logical flow diagram generally showing one embodiment of a process for synchronizing a local secondary file with a remote primary file for a local file read request.

FIGS. 5 and 6 illustrate logical flow diagrams generally showing embodiments of processes related to local file write requests and local file read requests, respectively. Process 500 of FIG. 5 and process 600 of FIG. 6 may be performed by a given cluster of nodes, such that a local file may be a file maintained by the given cluster of nodes and a remote file may be a file maintained by a different cluster of nodes.

FIG. 5 illustrates a logical flow diagram generally showing one embodiment of a process for designating a local secondary file as a local primary file for a local file write request. In some embodiments, process 500 of FIG. 5 may be implemented by and/or executed on one or more network devices, such as network device 300 of FIG. 3.

Process 500 begins, after a start block, at block 502, where a local file write request may be provided. In some embodiments, a client device, such as client devices 102-105 of FIG. 1, may provide a write request to a given cluster (e.g., FSD 112 of FIG. 1) for a file that is local to the given cluster. In various embodiments, a local file that corresponds to the write request may be a primary file or a secondary file.

Process 500 continues at decision block 504, where a determination may be made whether a local file for the write request is a primary file. In some embodiments, the local file may include metadata, a tag, or the like to indicate whether a file is a primary file or a secondary file. In other embodiments, an inode of the local file may include an identifier indicating a designation of the file, such as a primary file or a secondary file. In yet other embodiments, the local cluster may maintain a table, or other data structure, indicating which files may be primary files and which files may be secondary files. If the local file is a primary file, then processing may flow to decision block 514; otherwise, the local file may be a local secondary file and processing may flow to decision block 506.

At decision block 514, a determination may be made whether the local primary file is locked by a remote cluster. In at least one embodiment, the local cluster may maintain a list of locked files. If the local primary file is locked, then processing may flow to block 516; otherwise, processing may flow to block 512.

At block 516, a lock on the local primary file may be revoked. In at least one embodiment, the local cluster may notify a current holder of the lock that the local primary file is about to be modified. In some embodiments, revoking the lock may include at least a partial handshake between the local cluster and the remote cluster to ensure the remote cluster finishes a current operation on the locked file. Processing then flows to block 512.

If the local file is a secondary file as determined at decision block 504, then processing may flow to decision block 506. At decision block 506, a determination may be made whether the local secondary file is current. In some embodiment, to determine if the local secondary file is current, the local secondary file may be compared to a corresponding remote primary file. In at least one embodiment, decision block 506 may employ embodiments of block 408 of FIG. 4 to compare a secondary file with a primary file. For example, in at least one embodiment, a version of the local secondary file may be compared with a version of the remote primary file. If a version of the local secondary file matches a version of the remote primary file, then the local secondary file may be current. In another example, a file modification time of the local secondary file may be compared with a file modification time of the remote primary file, such that the local secondary file may not be current if the file modified time of the remote primary file is more recent than the file modified time of the local secondary file. However, embodiments are not so limited and other file attributes may be compared or other methods for determining if the local secondary file is current may be employed. If the local secondary file is current, then processing may flow to block 510; otherwise, processing may flow to block 508.

At block 508, the local secondary file may be synchronized with a corresponding remote primary file. In at least one embodiment, block 508 may employ embodiments of block 408 of FIG. 4 to synchronize the local secondary file with the remote primary file. For example, in some embodiments, the local secondary file may be updated based on a determined delta between the remote primary file and the local secondary file. However, embodiments are not so limited and other methods for synchronizing two files may be employed, such as, but not limited to, overwriting the local secondary file with the remote primary file.

In any event, process 500 continues at block 510, where the local file may be designated as a primary file and the remote file may be designated as the secondary file. In at least one embodiment, the local file may be designated as a primary file and the remote file may be designated as the secondary file if the local file is affirmatively validated (i.e., the local file is successfully updated based on the remote file). In some embodiments, a file attribute, tag, or the like may be modified to indicate the new file designation. In at least one embodiment, an inode of the local file may be modified to indicate that the local file is now the primary file and an inode of the remote file may be modified to indicate that the remote file is now a secondary file. In some other embodiments, a table and/or list maintained by each cluster may be updated to indicate a new designation of local files.

In at least one of various embodiments, block 510 may be optional and my not be performed. In one such embodiment, write access to the remote primary file may be provided. In some embodiments, providing write access to the remote primary file may include obtaining a lock on the remote primary file. In at least one embodiment, providing write access may enable a remote cluster to modify the remote primary file based on the provided local file write request. In some embodiments, a local secondary file may be updated based on the modified remote primary file and processing may return to a calling process to perform other actions.

As described above, in some embodiments, the local secondary file may be a cached version of the remote primary file. In at least one such embodiment, block 510 may not be performed and process 500 may flow from block 508 to block 512, where write access may be provided to the local secondary cache file and/or the remote primary file.

Process 500 proceeds to block 512, where write access to the local primary file may be provided. In some embodiments, providing write access may include obtaining a lock on the local primary file. In at least one embodiment, providing write access may enable the local cluster to modify the local primary file.

After block 512, process 500 may return to a calling process to perform other actions.

FIG. 6 illustrates a logical flow diagram generally showing one embodiment of a process for synchronizing a local secondary file with a remote primary file for a local file read request. In some embodiments, process 600 of FIG. 6 may be implemented by and/or executed on one or more network devices, such as network device 300 of FIG. 3.

Process 600 begins, after a start block, at block 602, where a local file read request may be provided. In some embodiments, a client device, such as client devices 102-105 of FIG. 1, may provide a read request to a given cluster (e.g., FSD 112 of FIG. 1) for a file that is local to the given cluster. In various embodiments, a local file that corresponds to the read request may be a primary file or a secondary file.

Process 600 continues at decision block 604, where a determination may be made whether the local file for the read request is a primary file. In at least one of various embodiments, decision block 604 may employ embodiments of decision block 504 of FIG. 5 to determine whether the local file is a primary file. If the local file is a primary file, then processing may flow to block 612; otherwise, the local file may be a local secondary file and processing may flow to block 606.

At block 606, a lock of a remote primary file that corresponds to the read request may be obtained. In some embodiments, block 606 may be optional. In at least one embodiment, the lock obtained on the remote primary file may be a partial lock, such that the remote cluster may notify the local cluster before the remote cluster performs an action on the remote primary file (e.g., modifying the remote primary file) that may invalidate the local secondary file. For example, assume Cluster_A maintains the primary file and Cluster_B maintains the secondary file, and a local read request is provided to Cluster_B. Cluster_B may obtain a lock on the primary file at Cluster_A such that Cluster_A may notify Cluster_B if Cluster_A is about to perform an action (e.g., Cluster_A may modify the primary file) on the primary file that may invalidate the secondary file at Cluster_B.

In various other embodiments, a partial lock may also include range locks, revocable locks, shared-exclusive locks, or the like. In some embodiments, the partial lock may be a range lock that may lock a subset of a file. In at least one embodiment, a cluster may obtain a partial lock on a subset of the file being asynchronously replicated and/or synchronously validated. In other embodiments, the partial lock may be a revocable lock where a first cluster may be enabled to provide a lock for a file (or a portion of a file) to a second cluster, where the first cluster can revoke the lock from the second cluster. In yet other embodiments, the partial lock may be a shared-exclusive lock where multiple clusters can share a lock to read a file, but a single cluster may have an exclusive lock to write to the file.

Process 600 next proceeds to decision block 608, where a determination may be made whether the local secondary file is current. In at least one of various embodiments, decision block 608 may employ embodiments of decision block 506 of FIG. 5 to determine whether the local secondary file is current. If the local secondary file is current, then processing flows to block 612; otherwise, processing flows to block 610.

At block 610, the local secondary file may be synchronized with the remote primary file. In at least one of various embodiments, block 610 may employ embodiments of block 508 of FIG. 5 to synchronize the local secondary file with the remote primary file. In some embodiments, synchronizing the local secondary file with the remote primary file may include validating a select subset of the local secondary file with the remote primary file. In at least one embodiment, the select subset of the local secondary file may include, but is not limited to, local secondary file metadata, data being read from the local secondary file, or the like. In some embodiments, synchronization may include an attempt to obtain a lock on the remote primary file, a determination if the local secondary file is current, and/or a determination if specific blocks of the local secondary file are current. In at least one embodiment, a remote cluster may deny a lock request (including at block 606), but may notify the local cluster if the local secondary file is current and/or if the specific blocks are current. In one such embodiment, the local secondary file may be synchronized with the remote primary file without obtaining a lock on the remote primary file.

As described in more detail above, in some embodiments, the local secondary file may be a cached version of the primary file. In at least one such embodiment, the local secondary file may be a temporary file and/or a partial copy of the remote primary file. In some embodiments, the local secondary cached file may be synchronized by purging the secondary file and/or purging out-of-date sections of the local secondary file.

In any event, process 600 next proceeds to block 612, where read access may be provided to the local file. In at least one embodiment, providing read access to the local file may include enabling a client device to read the local file. In some embodiments, if, at decision block 602, the local file is a primary file, then read access may be provided to the local primary file. In other embodiments, if, at decision block 602, the local file is a secondary file, then read access may be provided to the local secondary file. In some other embodiments, read access may be a pass-through read, such that read access may be provided to the remote primary file. In at least one embodiment, a lock obtained on the remote primary file (at block 606) may be released when read access of the local secondary file completes.

After block 612, process 600 may return to a calling process to perform other actions.

Figure 7:
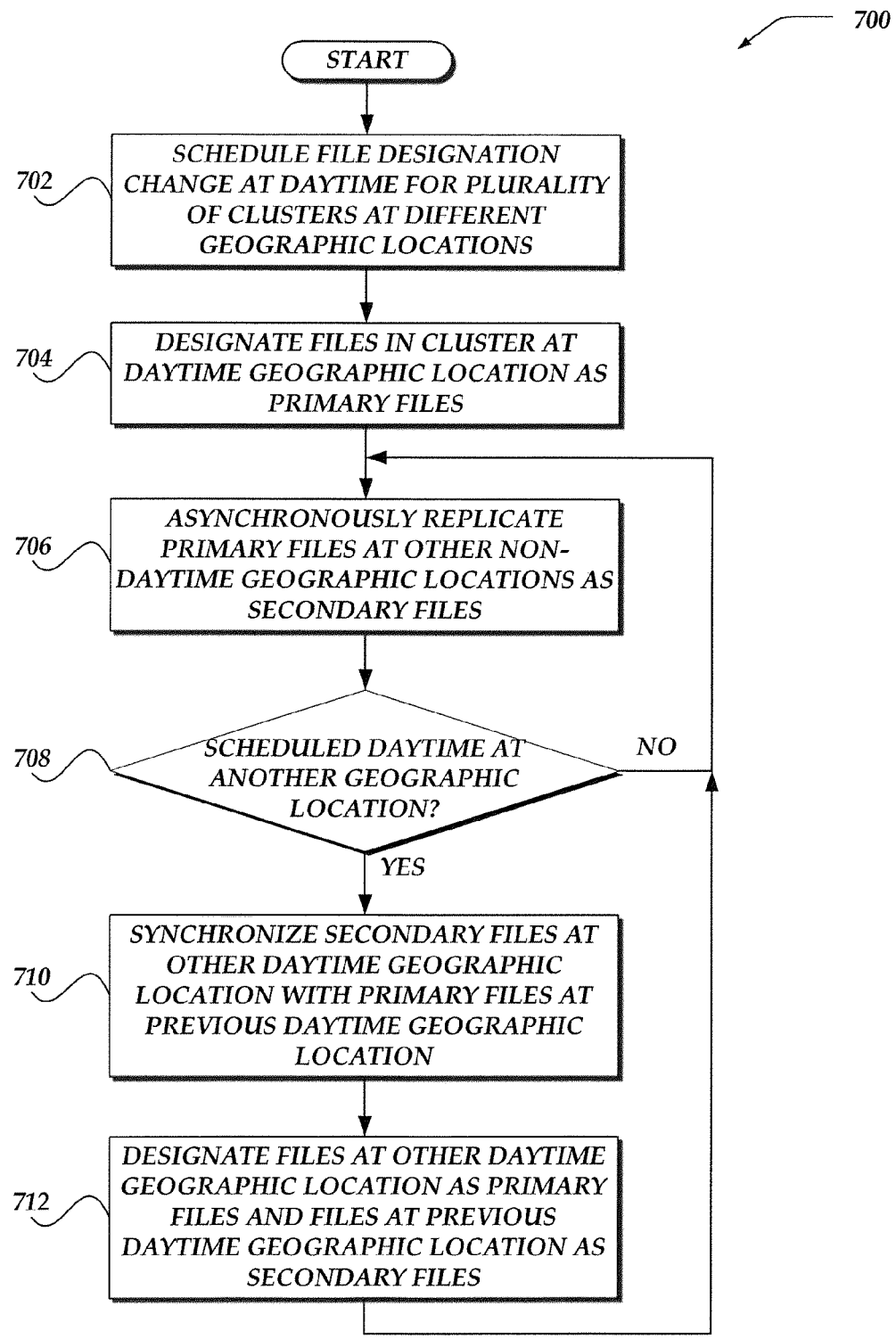
FIG. 7 illustrates a logical flow diagram generally showing one embodiment of a process for preemptively designating files at a given cluster as primary files based on a file designation change schedule for a plurality of clusters at different geographic locations.

FIG. 7 illustrates a logical flow diagram generally showing one embodiment of a process for automatically changing file designations at a given cluster as primary files based on a file designation change schedule for a plurality of clusters at different geographic locations. In at least one embodiment, process 700 may enable preemptive file designation changes prior to a file access request for a secondary file being provided. In some embodiments, process 700 of FIG. 7 may be implemented by and/or executed on one or more network devices, such as network device 300 of FIG. 3.

Process 700 begins, after a start block, at block 702, where daytime file designation changes may be scheduled for a plurality of clusters at different geographic locations. In at least one embodiment, each of a plurality of clusters may be distributed at a different physical geographic location. In some embodiments, each of the plurality of clusters may be located in geographically separate time zones. For example, one cluster may be physically located in London, England, another cluster may be physically located in Seattle, Wash., USA, and another cluster may be physically located in Tokyo, Japan. As used herein the term "daytime" may refer to a time of day when files at a given cluster may be designated as primary files. In contrast, the term "non-daytime" may refer to a time of day when files at a given cluster may be designated as secondary files.

In some embodiments, the file designations change schedule may be based on local business hours for the different geographic locations (i.e. time zone business hours). In at least one such embodiment, daytime may include local business hours for the geographic location of a given cluster. For example, the daytime file designation change schedule may indicate that during London daytime business hours, files at a cluster in London may be designated as primary files and files at clusters in other locations (e.g., Seattle) may be designated as secondary files. File designations may change during Seattle daytime business hours; such that files at a cluster in Seattle may be designated as primary files and files at clusters in other locations (e.g., London) may be designated as secondary files. Since the access of files typically increases during business hours, the daytime file designation change schedule may allow files to preemptively change designations before a local file access requests are received. One example of a daytime file designation change schedule is described in more detail below in conjunction with FIG. 8. However, embodiments are not so limited and other designation change schedules may be implemented.

In some other embodiments, file designations may change based on a combination of a file designation change schedule and local write requests (such as is described in more detail above in conjunction with FIG. 5). In one non-limiting, non-exhaustive example, file designations for a subset of files may change based on a file designation change schedule, while file designations for a different subset of files may changes based on local write requests. In yet other embodiments, a designation of a file may be pinned, such that the designation is locked and may not change.

Process 700 continues at block 704, where files in a cluster at a current daytime geographic location may be designated as primary files. In at least one embodiment, block 704 may be employed in initialize the file designation change schedule. In some embodiments, a determination may be made which cluster is located at a current daytime geographic location. In some embodiments, a current clock time may be utilized to determine when to change file designations. In at least one embodiment, the current clock may be Greenwich Mean Time ("GMT"), Coordinated Universal Time ("UTC"), International Atomic Time, or the like. In at least one embodiment, a current clock and the file designation change schedule may be utilized to determine a cluster at the current daytime geographic location. For example, if the current GMT time is 9:00 am, then a cluster located in London, England may be determined to the current daytime geographical location. In such an example, files at the cluster in London may be designated as primary files, while files at other geographic locations (i.e., non-daytime geographic locations) may be designated as secondary files.

Process 700 next proceeds to block 706, where the primary files may be asynchronously replicated at other non-daytime geographic locations as secondary files. In at least one of various embodiments, block 706 may employ embodiments of block 404 of FIG. 4 to asynchronously replicate primary files as secondary files at other non-daytime geographic locations.

Continuing to decision block 708, a determination may be made whether it is a scheduled daytime at another geographic location. In at least one embodiment, such a determination may be made based on a comparison of the current clock time (e.g., GMT) and the file designation change schedule. If the scheduled daytime is at another geographic location (e.g., the other geographic location is in a time zone that is currently during business hours), then processing may flow to block 710; otherwise, processing may flow to block 706 to continue to asynchronously replicate primary files.

At block 710, secondary files at the other daytime geographic location may be synchronized with primary files at the previous daytime geographic location. In some embodiments, secondary files (or a subset of secondary files) at the other daytime geographic location may be automatically synchronized with primary files at the previous daytime geographic location. In at least one of various embodiments, block 710 may employ embodiments of block 508 of FIG. 5 to synchronize secondary files with primary files (where the secondary files at the other daytime geographic location may correspond to the local secondary file of block 508 of FIG. 5 and the primary files at the previous daytime geographic location may correspond to the remote primary file of block 510 of FIG. 5).

Process 700 proceeds to block 712, where the files at the other daytime geographic location may be designated as primary files and the files at the previous daytime geographic location may be designated as secondary files. In some embodiments, a designation the files (or a subset of files) at the other daytime geographic location may be automatically changed to be primary files and designations of the files at the previous daytime geographic location may be automatically changed to be secondary files. In at least one of various embodiments, block 712 may employ embodiments of block 510 of FIG. 5 to swap file designations (where the files at the other daytime geographic location may correspond to the local file of block 510 of FIG. 5 and the files at the previous daytime geographic location may correspond to the remote file of block 510 of FIG. 5).

After block 712, process 700 may loop to block 706 to asynchronously replicate primary files as secondary files at other non-daytime geographic locations.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustrations

FIG. 8 illustrates a non-exhaustive example of a use case of an embodiment of a table indicating a schedule for changing a designation of files at different geographic locations based on a time of day at the different geographic locations. Example 800 may include a file designation change schedule for three different geographic locations: London, England; Tokyo, Japan; and Seattle, Wash., USA. Columns 802, 804, and 806 may represent local times at each of the three different locations. As illustrated, column 802 may include a local time in London (e.g., GMT); column 804 may include a local time in Tokyo; and column 806 may include a local time in Seattle. Each row in columns 802, 804, and 806 may indicate a local time at a given location for a given time. For example, when it is 9:00 AM in Tokyo, it may be 5:00 PM in Seattle and 12:00 AM in London.

Columns 808, 810, and 812 may indicate a designation of files at a corresponding location. As illustrated, column 808 may include a designation of files in London; column 810 may include a designation of files in Tokyo; and column 812 may include a designation of files in Seattle. Each row in columns 808, 810, and 812 may indicate a designation of files at a given location for a given time. For example, at 12:00 AM GMT (i.e., 9:00 AM local time in Tokyo) files in Tokyo may be designated as primary files, while files in London and Seattle may be designated as secondary files. Similarly, at 8:00 AM GMT (i.e., 8:00 AM local time in London), a designation of files in London may change from secondary to primary and a designation of files in Tokyo may change from primary to secondary. Further, at 4:00 PM GMT (i.e., 9:00 AM local time in Seattle), a designation of files in Seattle may change from secondary to primary and a designation of files in London may change from primary to secondary. In this way, local files in may be primary files during local daytime business hours.

However, this example should not be construed as limiting. In some embodiments, other times, locations, intervals, or the like may be utilized to determine when and where to change file designations. In other embodiments, some files may not change designations based on the schedule. For example, in at least one embodiment, some files may change designations based on a schedule, while other files may change based on a write request, such as is described above in conjunction with FIG. 5. In another embodiment, some files may be pinned as a specific designation, such that it may not change. For example, files in a cluster designated as a backup system may remain as secondary files. In some embodiments, pinning a file may be predetermined, user determined and/or modifiable, or the like.

Figure 9A:
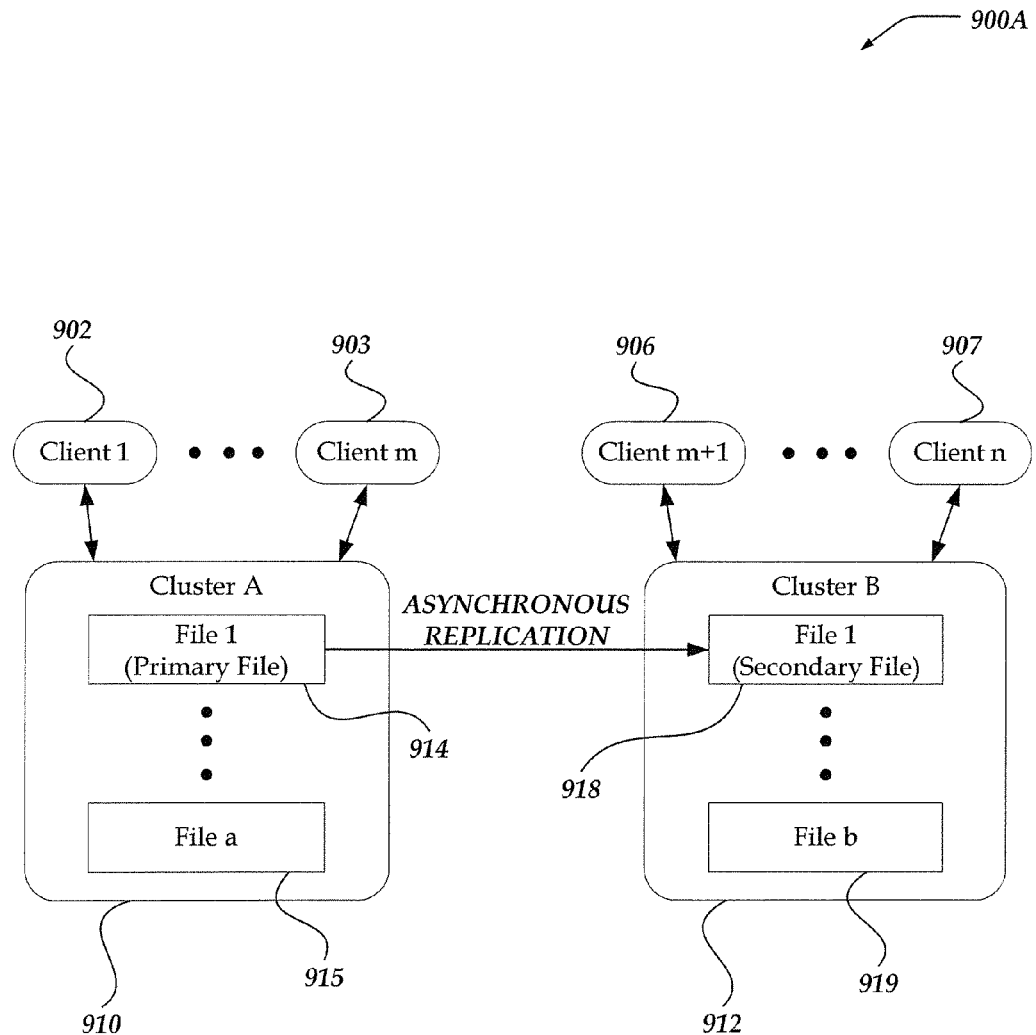
FIGS. 9A-9C show overview system diagrams generally showing at least one embodiment of a use case illustration of a plurality of clusters performing asynchronous replication of a primary file and synchronous validation of a secondary file.
Figure 9B:
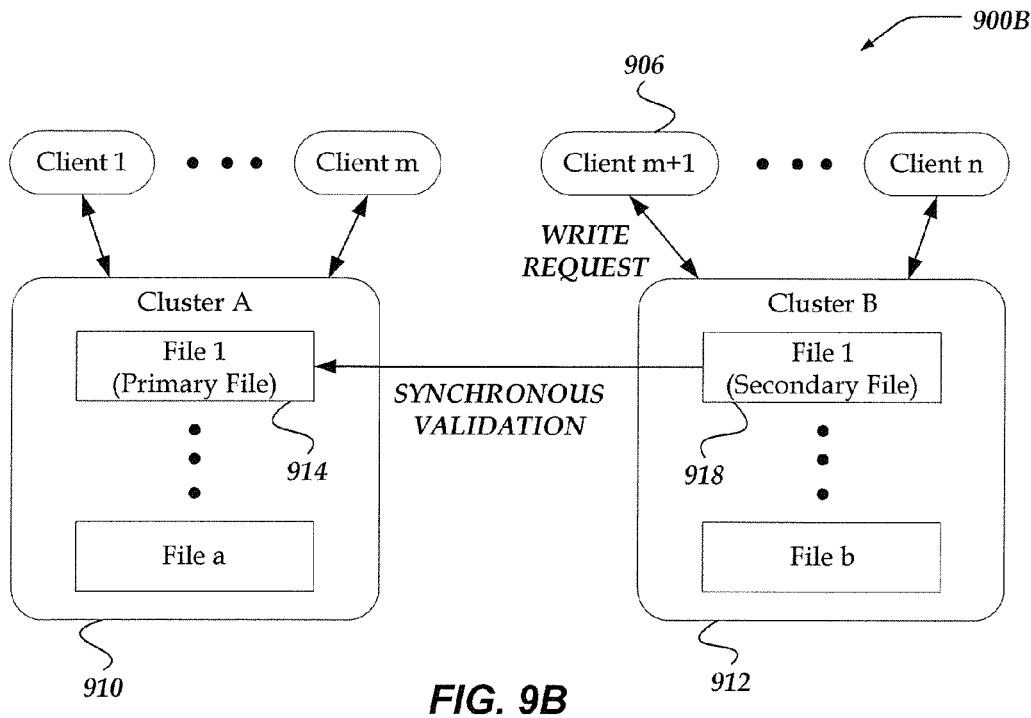
Figure 9C:
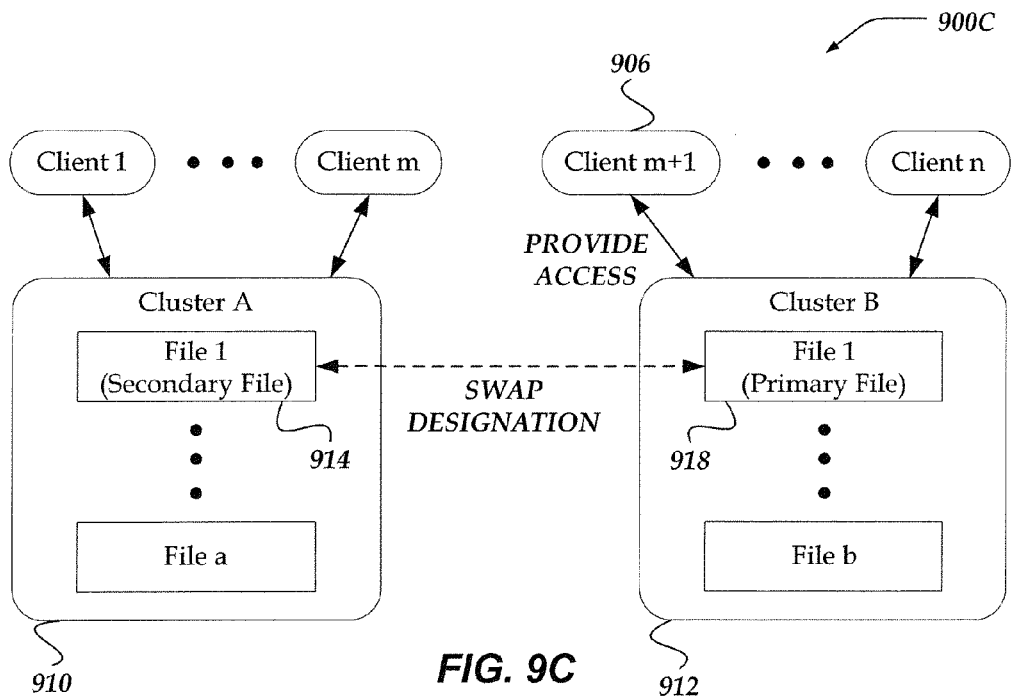

FIGS. 9A-9C show overview system diagrams generally showing at least one embodiment of a use case illustration of a plurality of clusters performing asynchronous replication of a primary file and synchronous validation of a secondary file.

FIG. 9A shows a system diagram generally showing one embodiment of a use case illustration of a plurality of clusters of nodes performing asynchronous replication of a primary file. As shown, system 900A may include cluster 910 and cluster 912. Although two clusters are illustrated, embodiments are not so limited; rather, other numbers of cluster may also be employed. Client devices 902-903 may have local access to cluster 910, while client devices 906-907 may have local access to cluster 912. In some embodiments, client devices 902-903 and/or 906-907 may be embodiments of client device 200 of FIG. 2.

In some embodiments, a plurality of files may be maintained by a given cluster. As illustrated, files 914-915 may be maintained by cluster 910 and files 918-919 may be maintained by cluster 912. Each of files 914-915 and 918-919 may include a file designation. For example, file 914 may include a primary file designation and file 918 may include a secondary file designation. In at least one embodiment, primary files on one cluster may have one or more corresponding secondary files on other clusters. As described above, primary files may be asynchronously replicated at another cluster as a secondary file. As illustrated, file 914 (i.e., a primary file) on cluster 910 may be asynchronously replicated at cluster 912 as file 918 (i.e., a secondary file). In at least one of various embodiments, asynchronous replication may be performed as described in more detail above, such as at block 404 of FIG. 4.

FIG. 9B shows a system diagram generally showing one embodiment of a use case illustration of a plurality of clusters of nodes performing synchronous validation of a secondary file. System 900B may include embodiments of system 900A of FIG. 9A. In some embodiments, client device 906 may provide a local write request to cluster 912 for file 918. In at least one embodiment, since file 918 is a secondary file, cluster 912 may synchronously validate file 918 with file 910 prior to providing write access to file 918. In at least one of various embodiments, synchronous validation may be performed as described in more detail above, such as at block 508 of FIG. 5.

FIG. 9C shows a system diagram generally showing one embodiment of a use case illustration of a plurality of clusters of nodes performing a file designation swap. System 900C may include embodiments of system 900A of FIG. 9A. After a secondary file is synchronously validated, the file designation of file 918 may swap with the file designation of file 914. As shown, file 918 may become the primary file and file 914 may become the secondary file. After file 918 becomes the primary file, cluster 912 may provide access to file 918 to client device 906. In at least one of various embodiments, swapping file designations may be performed as described in more detail above, such as at block 510 of FIG. 5.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for managing files for a plurality of network devices distributed over a network, wherein at least one of the network devices performs actions, comprising:
   determining a file that is designated as a primary file managed by a first cluster of nodes wherein nodes in the first cluster of nodes are connected through a first high-bandwidth and low latency network backplane;
   asynchronously replicating the file as an other file managed by a second cluster of nodes, wherein the other file is designated as a secondary file, wherein nodes in the second cluster of nodes are connected through a second high-bandwidth and low latency network backplane;

if a local file access request for the other file from a client device is provided to the second cluster of nodes, synchronously validating the other file managed by the second cluster of nodes based on the file managed by the first cluster of nodes; and if the other file is affirmatively validated, enabling the client device to locally access the other file managed by the second cluster of nodes, wherein if the local file access request is a local write request, changing the designation of the file to a secondary file and changing the designation of the other file to a primary file.

2. The method of claim 1, wherein synchronously validating the other file further comprises:

if the local file access request is a local read request:
employing the second cluster of nodes to obtain at least a partial lock on the file, wherein the first cluster of nodes is enabled to modify the partially locked file; and employing the first cluster of nodes to notify the second cluster of nodes if the partially locked file is modified.

3. The method of claim 1, wherein the synchronous validation further comprises if the file is a newer version than the other file, updating the other file based on the file.

4. The method of claim 1, further comprising:

physically locating at least the first cluster of nodes and the second cluster of nodes in geographically separate time zones;

if the geographic time zone at the second cluster of nodes is currently during business hours, automatically changing at least the other file from the secondary file designation to the primary file designation and automatically changing at least the file from the primary file designation to the secondary file designation; and if the geographic time zone at the first cluster of nodes is currently during business hours and at least the file is designated as a secondary file, automatically changing at least the file from the secondary file designation to the primary file designation and automatically changing at least the other file from a primary file designation to the secondary file designation.

5. The method of claim 1, wherein the file and the other file further comprises at least an attribute that identifies their designation as one of the primary file and the secondary file.

6. The method of claim 1, further comprises pinning a designation of one of the file and the other file as the primary file, wherein the pinned designation is locked.

7. A system for managing files for a plurality of network devices distributed over a network, comprising:

at least one network device, comprising:
a memory for storing data and instructions;
a processor that executes the instructions to enable actions, comprising:

determining a file that is designated as a primary file managed by a first cluster of nodes wherein nodes in the first cluster of nodes are connected through a first high-bandwidth and low latency network backplane;

asynchronously replicating the file as an other file managed by a second cluster of nodes, wherein the other file is designated as a secondary file, wherein nodes in the second cluster of nodes are connected through a second high-bandwidth and low latency network backplane;

if a local file access request for the other file from a client device is provided to the second cluster of nodes, synchronously validating the other file managed by the second cluster of nodes based on the file managed by the first cluster of nodes; and if the other file is affirmatively validated, enabling the client device to locally access the other file managed by the second cluster of nodes, wherein if the local file access request is a local write request, changing the designation of the file to a secondary file and changing the designation of the other file to a primary file.

8. The system of claim 7, wherein synchronously validating the other file further comprises:

if the local file access request is a local read request:
employing the second cluster of nodes to obtain at least a partial lock on the file, wherein the first cluster of nodes is enabled to modify the partially locked file; and employing the first cluster of nodes to notify the second cluster of nodes if the partially locked file is modified.

9. The system of claim 7, wherein the synchronous validation further comprises if the file is a newer version than the other file, updating the other file based on the file.

10. The system of claim 7, further comprising:

physically locating at least the first cluster of nodes and the second cluster of nodes in geographically separate time zones;

if the geographic time zone at the second cluster of nodes is currently during business hours, automatically changing at least the other file from the secondary file designation to the primary file designation and automatically changing at least the file from the primary file designation to the secondary file designation; and if the geographic time zone at the first cluster of nodes is currently during business hours and at least the file is designated as a secondary file, automatically changing at least the file from the secondary file designation to the primary file designation and automatically changing at least the other file from a primary file designation to the secondary file designation.

11. The system of claim 7, wherein the file and the other file further comprises at least an attribute that identifies their designation as one of the primary file and the secondary file.

12. The system of claim 7, further comprises pinning a designation of one of the file and the other file as the primary file, wherein the pinned designation is locked.

13. A processor readable non-transitory storage media that includes instructions for managing files for a plurality of network devices distributed over a network, wherein the execution of the instructions by a processor enables actions, comprising:

determining a file that is designated as a primary file managed by a first cluster of nodes wherein nodes in the first cluster of nodes are connected through a first high-bandwidth and low latency network backplane;

asynchronously replicating the file as an other file managed by a second cluster of nodes, wherein the other file is designated as a secondary file, wherein nodes in the second cluster of nodes are connected through a second high-bandwidth and low latency network backplane;

if a local file access request for the other file from a client device is provided to the second cluster of nodes, synchronously validating the other file managed by the second cluster of nodes based on the file managed by the first cluster of nodes; and if the other file is affirmatively validated, enabling the client device to locally access the other file managed by the second cluster of nodes, wherein if the local file access request is a local write request, changing the designation of the file to a secondary file and changing the designation of the other file to a primary file.

14. The media of claim 13, wherein synchronously validating the other file further comprises:
   if the local file access request is a local read request:
      employing the second cluster of nodes to obtain at least a partial lock on the file, wherein the first cluster of nodes is enabled to modify the partially locked file; and
      employing the first cluster of nodes to notify the second cluster of nodes if the partially locked file is modified.

15. The media of claim 13, wherein the synchronous validation further comprises if the file is a newer version than the other file, updating the other file based on the file.

16. The media of claim 13, further comprising:
   physically locating at least the first cluster of nodes and the second cluster of nodes in geographically separate time zones;
   if the geographic time zone at the second cluster of nodes is currently during business hours, automatically changing at least the other file from the secondary file designation to the primary file designation and automatically changing at least the file from the primary file designation to the secondary file designation; and
   if the geographic time zone at the first cluster of nodes is currently during business hours and at least the file is designated as a secondary file, automatically changing at least the file from the secondary file designation to the primary file designation and automatically changing at least the other file from a primary file designation to the secondary file designation.

17. The media of claim 13, wherein the file and the other file further comprises at least an attribute that identifies their designation as one of the primary file and the secondary file.

18. The media of claim 13, further comprises pinning a designation of one of the file and the other file as the primary file, wherein the pinned designation is locked.

* * * * *